United States Patent
Beaujard et al.

(10) Patent No.: US 11,187,107 B2
(45) Date of Patent: Nov. 30, 2021

(54) TURBOJET WITH BEARING ARCHITECTURE OPTIMISED FOR THE SUPPORT OF A LOW PRESSURE SHAFT

(71) Applicant: SAFRAN AIRCRAFT ENGINES, Paris (FR)

(72) Inventors: Antoine Jean-Philippe Beaujard, Moissy-Cramayel (FR); Serge Benyamin, Moissy-Cramayel (FR); Tewfik Boudebiza, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 102 days.

(21) Appl. No.: 16/483,118

(22) PCT Filed: Feb. 6, 2018

(86) PCT No.: PCT/FR2018/050287
§ 371 (c)(1),
(2) Date: Aug. 2, 2019

(87) PCT Pub. No.: WO2018/146411
PCT Pub. Date: Aug. 16, 2018

(65) Prior Publication Data
US 2020/0232339 A1     Jul. 23, 2020

(30) Foreign Application Priority Data
Feb. 7, 2017     (FR) ..................................... 17 00130

(51) Int. Cl.
*F01D 25/16*     (2006.01)
*F02C 7/06*     (2006.01)
*F02K 3/02*     (2006.01)

(52) U.S. Cl.
CPC .............. *F01D 25/162* (2013.01); *F02C 7/06* (2013.01); *F02K 3/025* (2013.01);
(Continued)

(58) Field of Classification Search
CPC ........... F01D 25/16; F01D 25/162; F02C 7/06
See application file for complete search history.

(56) References Cited

U.S. PATENT DOCUMENTS 3,844,110 A * 10/1974 Widlansky ................ F02C 7/06
60/39.08
6,944,580 B1 * 9/2005 Blume .................... G06F 30/23
703/1
(Continued)

FOREIGN PATENT DOCUMENTS

EP     1596038 B1     11/2005
FR     1527370 A     5/1968
(Continued)

OTHER PUBLICATIONS

Search Report issued in French Patent Application No. 17 00130 dated Dec. 22, 2017.
(Continued)

*Primary Examiner* — Igor Kershteyn
*Assistant Examiner* — Topaz L. Elliott
(74) *Attorney, Agent, or Firm* — Pearne & Gordon LLP

(57) ABSTRACT

A turbojet includes an inlet casing, a low pressure compressor, a high pressure spool, a low pressure turbine, and an exhaust casing. The inlet casing and the low pressure compressor define an air inlet channel that divides downstream into a primary flow channel and a secondary flow channel. A low pressure shaft is supported by a first roller bearing, borne by the inlet casing, a second bearing borne by the intermediate casing, a third bearing borne by the exhaust casing, and an additional ball bearing borne by the interme-
(Continued)

diate casing and arranged between the first bearing and the second bearing. Such a configuration of bearings makes it possible to withstand an increased level of load and to be compatible with an increase in the rate of dilution.

18 Claims, 2 Drawing Sheets

(52) U.S. Cl.
CPC ............... *F05D 2220/323* (2013.01); *F05D 2220/3217* (2013.01); *F05D 2240/54* (2013.01); *F05D 2250/36* (2013.01)

(56) References Cited

U.S. PATENT DOCUMENTS

| | | | | |
|---|---|---|---|---|
| 7,097,413 | B2* | 8/2006 | VanDuyn | F01D 21/08 |
| | | | | 415/9 |
| 10,072,508 | B2 | 9/2018 | Beaujard | |
| 10,364,749 | B2* | 7/2019 | Hanrahan | F02C 7/141 |
| 10,385,868 | B2* | 8/2019 | King | F04D 29/522 |
| 10,751,958 | B2* | 8/2020 | Kray | D03D 25/005 |
| 10,823,064 | B2* | 11/2020 | Moniz | F02C 3/06 |
| 2005/0106009 | A1* | 5/2005 | Cummings | F04D 29/545 |
| | | | | 415/145 |
| 2005/0254945 | A1* | 11/2005 | VanDuyn | F16C 27/04 |
| | | | | 415/229 |
| 2006/0201160 | A1* | 9/2006 | Richards | F02C 7/06 |
| | | | | 60/792 |
| 2013/0015018 | A1* | 1/2013 | Gauthier | F16J 15/3288 |
| | | | | 184/6.11 |
| 2013/0075975 | A1* | 3/2013 | Hilaris | F04C 15/0003 |
| | | | | 277/350 |
| 2013/0195647 | A1* | 8/2013 | Muldoon | F02C 7/06 |
| | | | | 415/229 |
| 2015/0016994 | A1* | 1/2015 | Burghardt | F01D 25/16 |
| | | | | 415/229 |
| 2016/0082674 | A1* | 3/2016 | Kray | D03D 11/02 |
| | | | | 415/209.3 |
| 2016/0290236 | A1 | 10/2016 | Boudebiza et al. | |
| 2017/0175632 | A1* | 6/2017 | Hanrahan | F02C 7/12 |
| 2018/0010616 | A1* | 1/2018 | King | F04D 29/023 |
| 2018/0100435 | A1* | 4/2018 | Moniz | F01D 25/16 |
| 2019/0383216 | A1* | 12/2019 | Benyamin | F02K 3/06 |
| 2020/0032664 | A1* | 1/2020 | Beaujard | F02C 7/18 |

FOREIGN PATENT DOCUMENTS

| | | |
|---|---|---|
| FR | 1603361 A | 4/1971 |
| FR | 2219312 A1 | 9/1974 |

OTHER PUBLICATIONS

International Search Report issued in Application No. PCT/FR2018/050287 dated May 30, 2018.
Written Opinion issued in Application No. PCT/FR2018/050287 dated May 30, 2018.

* cited by examiner

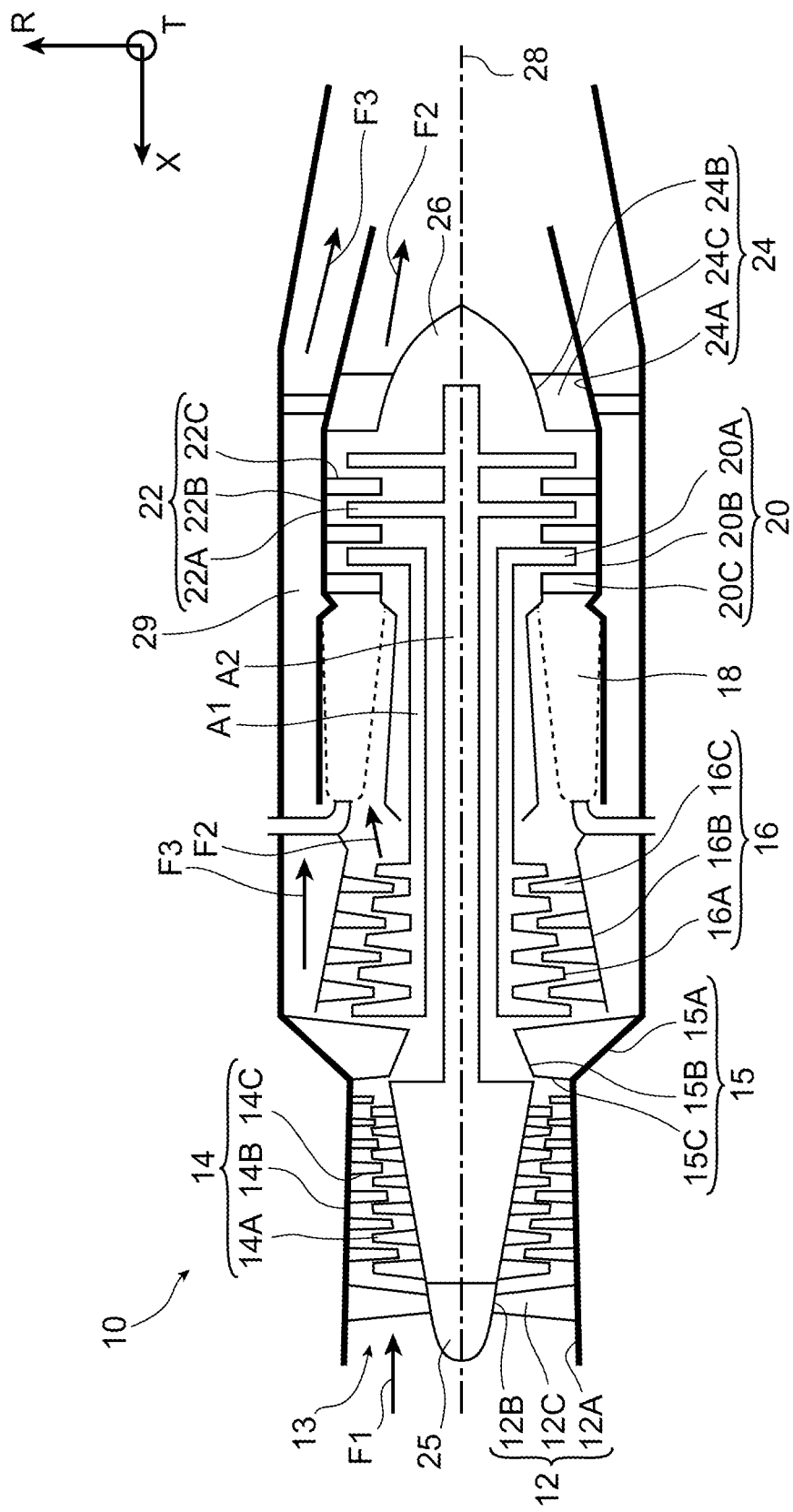
FIG. 1 --Prior Art--

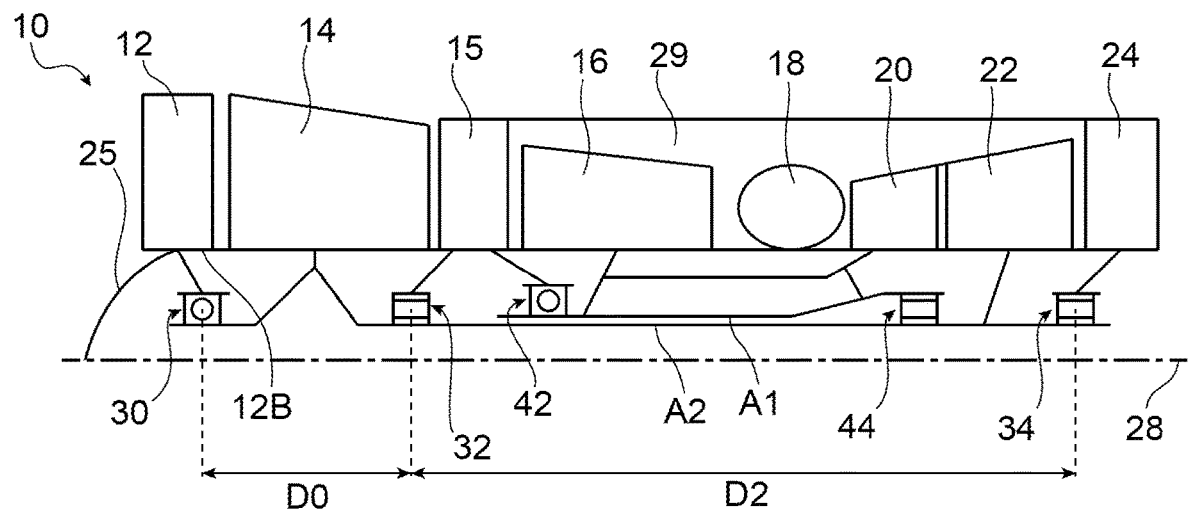
FIG. 2   --Prior Art--
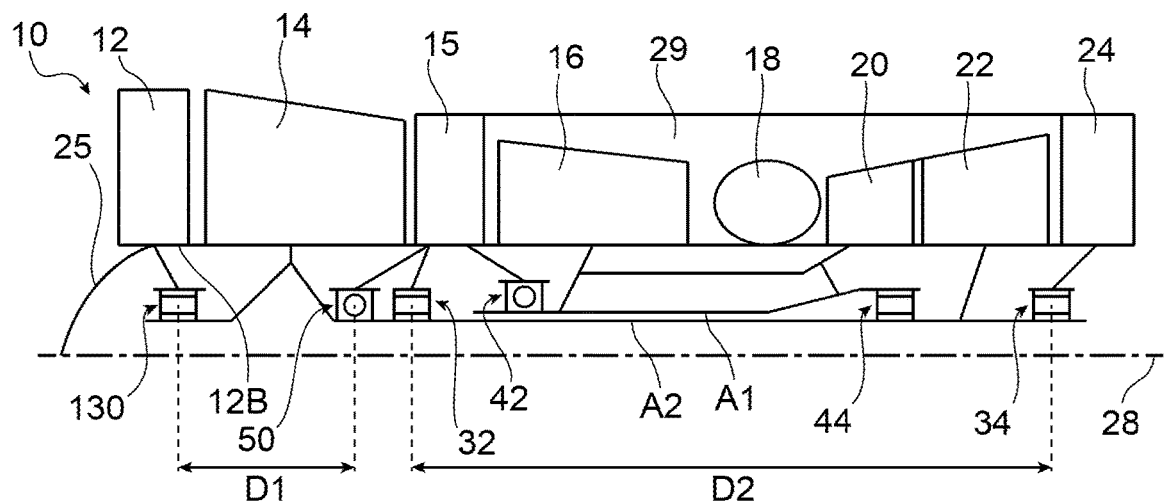
FIG. 3

TURBOJET WITH BEARING ARCHITECTURE OPTIMISED FOR THE SUPPORT OF A LOW PRESSURE SHAFT

This is the National Stage application of PCT international application PCT/FR2018/050287, filed on Feb. 6, 2018 entitled "TURBOJET COMPRISING AN ARCHITECTURE OF BEARINGS OPTIMISED TO SUPPORT A LOW-PRESSURE SHAFT", which claims the priority of French Patent Application No. 17 00130 filed Feb. 7, 2017, both of which are incorporated herein by reference in their entirety.

TECHNICAL FIELD

The present invention pertains to the field of turbojets, notably those intended for aircraft propulsion.

The invention more specifically relates to a twin spool turbojet, including, from upstream to downstream, an inlet casing, a low pressure compressor, a high pressure spool, a low pressure turbine connected to the low pressure compressor by a low pressure shaft, and an exhaust casing, in which the inlet casing and the low pressure compressor define an air inlet channel of the turbojet, which divides downstream of the low pressure compressor into a primary flow channel and into a secondary flow channel, and in which the low pressure shaft is supported by a first bearing borne by the inlet casing, a second bearing borne by the intermediate casing, and a third bearing borne by the exhaust casing.

In such a turbojet, the low pressure compressor has to treat all the flow entering into the turbojet, from the moment that the division of this incoming flow into a primary flow and a secondary flow takes place downstream of the low pressure compressor. In addition, the low pressure compressor operates at relatively high speeds, for example of the order of 10,000 rpm. Consequently, the low pressure compressor is subjected to a particularly high aerodynamic load, and the low pressure shaft has specific bending modes. The operating conditions of such a turbojet are thereby far from a double flow turbojet of the type comprising a fan upstream of the low pressure compressor and a division of the flow between the fan and the low pressure compressor.

PRIOR ART

A particular example of a known twin spool, double flow turbojet, of the type above, has a low rate of dilution, equal to around 0.3, and a maximum thrust of around 5.5 tonnes (i.e. around 55 kN).

In a turbojet of this type, the first bearing is a ball bearing whereas the second and third bearings are roller bearings. Hence, the majority of the axial loads are taken up by the first bearing, whereas the majority of the radial loads are taken up by the second bearing and the third bearing.

Within the scope of the development of a new engine, it is desirable to modify this known turbojet so as to increase considerably its rate of dilution, without reducing the value of its maximum thrust. The targeted value as regards the rate of dilution is for example around 1.5.

To enable such an increase in the rate of dilution without considerably increasing the radial and axial bulk of the turbojet, it is desirable to increase the outer diameter of the inlet casing, while minimising the hub ratio of this inlet casing, for example by maintaining the diameter of the hub of the inlet casing substantially unchanged.

Yet, the increase in the outer diameter of the inlet casing implies an increase in the axial and radial dimensions of the low pressure compressor, notably resulting in an increase in the axial aerodynamic loads applied to the rotor of the low pressure compressor, requiring an increase in the dimensions of the first bearing supposed to take up these axial loads.

The minimisation of the hub ratio of the inlet casing, within which is housed the first bearing, does not however enable such an increase in the dimensions of the first bearing.

DESCRIPTION OF THE INVENTION

The aim of the invention is notably to provide a simple, economic and efficient solution to this problem.

More generally, the aim of the invention is to make it possible to maximise the cross section of an inlet casing of a twin spool turbojet.

The invention proposes to this end a twin spool turbojet, including, from upstream to downstream, an inlet casing, a low pressure compressor, a high pressure spool, a low pressure turbine, and an exhaust casing, in which the low pressure compressor comprises a low pressure compressor rotor, and the low pressure turbine comprises a low pressure turbine rotor connected to the low pressure compressor rotor by a low pressure shaft, in which the inlet casing and the low pressure compressor define an air inlet channel of the turbojet, which divides downstream of the low pressure compressor into a primary flow channel traversing the high pressure spool, and into a secondary flow channel extending around the primary flow channel, and in which the low pressure shaft is supported by a first bearing borne by the inlet casing, a second bearing borne by the intermediate casing, and a third bearing borne by the exhaust casing.

According to the invention, the low pressure shaft is further supported by an additional bearing borne by the intermediate casing and arranged between the first bearing and the second bearing, and the first bearing is a roller bearing and the additional bearing is a ball bearing.

Due to the fact that the additional bearing is arranged downstream of the first bearing, the volume available for this additional bearing is greater than the volume available for the first bearing. The additional bearing may thus be of dimensions greater than those of the first bearing of a turbojet of the known type described above, and can thereby withstand a higher level of axial loads such as the level of axial loads applied to the low pressure shaft due to an increase in the outer diameter of the inlet casing.

In addition, the axial loads being mainly taken up by the additional bearing, the invention makes it possible to use, as first bearing, a roller bearing. Such a bearing, even while being of moderate dimensions, enables an efficient take up of the radial loads at the level of the upstream end of the low pressure shaft.

Optionally, the turbojet may comprise one or more of the following preferential characteristics, taken in isolation or according to all technically possible combinations thereof:

the first bearing is arranged at the level of an upstream end of the low pressure shaft;

the first bearing is arranged radially facing the inlet casing;

the second bearing is a roller bearing;

the second bearing is arranged radially facing the intermediate casing;

the second bearing is arranged radially facing a junction between the low pressure compressor and the intermediate casing;

the third bearing is a roller bearing;

the additional bearing is arranged radially facing the low pressure compressor;

the inlet casing comprises an outer shell, an inner shell, and a distributor connecting together the outer and inner shells;

the high pressure spool comprises a high pressure compressor and a high pressure turbine arranged downstream of the high pressure compressor;

the high pressure compressor comprises a high pressure compressor rotor, and the high pressure turbine comprises a high pressure turbine rotor connected to the high pressure compressor rotor by a high pressure shaft;

the high pressure shaft is supported by a fourth bearing borne by the intermediate casing and a fifth bearing interposed between the high pressure shaft and the low pressure shaft and arranged downstream of the fourth bearing and upstream of the third bearing;

the fourth bearing is a ball bearing;

the fifth bearing is a roller bearing.

BRIEF DESCRIPTION OF THE DRAWINGS

The invention will be better understood, and other details, advantages and characteristics will become clear from reading the following description given as a non-limiting example and by referring to the appended drawings among which:

FIG. 1 is a schematic axial section view of a twin spool, double flow turbojet of a known type;

FIG. 2 is a schematic axial section half-view of the turbojet of FIG. 1, illustrating the arrangement of the bearings of the high pressure and low pressure shafts of the turbojet;

FIG. 3 is a view similar to FIG. 2, illustrating a twin spool, double flow turbojet according to the invention.

In all of these figures, identical references can designate identical or analogous elements.

DETAILED DESCRIPTION OF A PREFERRED EMBODIMENT

FIG. 1 illustrates a twin spool, double flow turbojet 10 intended for aircraft propulsion and generally speaking including, from upstream to downstream, an inlet casing 12 delimiting an air inlet 13 of the turbojet, a low pressure compressor 14, an intermediate casing 15, a high pressure compressor 16, a combustion chamber 18, a high pressure turbine 20, a low pressure turbine 22, and an exhaust casing 24. The low pressure compressor 14 and the low pressure turbine 22 form a low pressure spool, whereas the high pressure compressor 16 and the high pressure turbine 20 form a high pressure spool. The inlet 12, intermediate 15 and exhaust 24 casings constitute the structural elements of the turbojet 10 through which transit the loads from the high pressure and low pressure bodies to an aircraft cell.

The inlet casing 12 comprises an outer shell 12A, an inner shell 12B forming the hub of the inlet casing, and a distributor 12C, that is to say an annular row of fixed blades, connecting the shells together. The inner shell is extended upstream by a stator inlet cone 25.

The intermediate casing 15 comprises an outer shell 15A, an inner shell 15B forming the hub of the intermediate casing, and structural arms 15C connecting the shells together.

In an analogous manner, the exhaust casing 24 comprises an outer shell 24A, an inner shell 24B forming the hub of the exhaust casing, and structural arms 24C connecting the shells together. The inner shell 24B is extended downstream by an exhaust cone 26.

In a well-known manner, the low pressure compressor 14 comprises a rotor 14A formed of several bladed wheels, and a stator including a low pressure compressor casing 14B and straightening vanes 14C connected to this casing.

In an analogous manner, the high pressure compressor 16 comprises a rotor 16A formed of several bladed wheels, and a stator including a high pressure compressor casing 16B and straightening vanes 16C connected to this casing 16B.

The high pressure turbine 20 comprises a rotor 20A formed of a bladed wheel, and a stator including a high pressure turbine casing 20B and a distributor 20C connected to this casing 20B.

Finally, the low pressure turbine 22 comprises a rotor 22A formed of two bladed wheels, and a stator including a low pressure turbine casing 22B and two distributors 22C connected to this casing 22B.

The number of bladed wheels of the compressors 14 and 16 and turbines 20 and 22 is obviously given uniquely for illustrative purposes and can vary without going beyond the scope of the present invention.

The rotors of the turbojet are rotationally mounted around a longitudinal axis 28 of the turbojet. The rotor 20A of the high pressure turbine 20 rotationally drives the rotor 16A of the high pressure compressor 16 through a shaft A1 called high pressure shaft, whereas the rotor 22A of the low pressure turbine 22 rotationally drives the rotor 14A of the low pressure compressor 14 through another shaft A2 called low pressure shaft. The shafts A1 and A2 are centred on the longitudinal axis 28, the high pressure shaft A1 extending around the low pressure shaft A2, in a well-known manner.

Throughout this description, the axial or longitudinal direction X is the direction of the longitudinal axis 28 of the turbojet. In addition, the radial direction R and the circumferential or tangential direction T are defined with reference to a cylindrical coordinates system centred on the longitudinal axis 28. Finally, the directions "upstream" and "downstream" are defined with reference to the general flow of gases in the turbojet along the axial direction X.

The inlet casing 12 and the low pressure compressor 14 define an air inlet channel of the turbojet, which divides downstream into a primary flow channel defined by the high pressure compressor 16, the combustion chamber 18, and the turbines 20 and 22, and into a secondary flow channel 29 extending around the primary flow channel.

In a well-known manner, the air inlet channel and the primary flow channel are delimited internally by an annular envelope formed notably of the inlet cone 25, inner shells 12B, 15B and 24B of the inlet, intermediate and exhaust casings, inner annular platforms (not visible in the figures) of bladed wheels of rotors 14A, 16A, 20A, and 22A, and inner shells (not visible in the figures) of straightening vanes 14C, 16C and distributors 20C and 22C.

Thus, in operation, the air F1 which has entered via the air inlet 13 and which has been compressed by the low pressure compressor 14, next divides into a primary flow F2 which circulates in the primary flow channel, and into a secondary flow F3 which circulates in the secondary flow channel 29. The primary flow F2 is thereby further compressed in the high pressure compressor 16, then mixed with fuel and ignited in the combustion chamber 18, before undergoing an expansion in the high pressure turbine 20 then in the low pressure turbine 22, then escaping through the exhaust channel. The secondary flow F3 bypasses the primary flow channel and generates an additional thrust at the outlet of the turbojet.

FIG. 2 schematically illustrates the architecture of the turbojet 10 in the case where this turbojet is of the known type described above.

Thus, the low pressure shaft A2 is supported by a first bearing 30 borne by the inlet casing 12, a second bearing 32 borne by the intermediate casing 15, and a third bearing 34 borne by the exhaust casing 24. In addition, the first bearing 30 is a ball bearing whereas the second and third bearings 32, 34 are roller bearings. These bearings 30, 32 and 34 are obviously housed in the aforesaid annular envelope. More specifically, the bearings are in general housed in respective lubrication housings, which are themselves housed in the aforesaid annular envelope.

The first bearing 30 is arranged at the level of an upstream end of the low pressure shaft A2, radially facing the inlet casing 12 and/or an upstream end of the low pressure compressor 14. The third bearing 34 is arranged at the level of a downstream end of the low pressure shaft A2, radially facing the exhaust casing 24 and/or a downstream end of the low pressure turbine 22. Finally, the second bearing 32 is arranged axially between the first bearing 30 and the third bearing 34, radially facing the low pressure compressor 14 and/or the intermediate casing 15.

Furthermore, the high pressure shaft A1 is supported by a fourth bearing 42 borne by the intermediate casing 15 and a fifth bearing 44 interposed between the high pressure shaft A1 and the low pressure shaft A2 and arranged downstream of the fourth bearing and upstream of the third bearing. These bearings 42 and 44 are obviously also housed in the aforesaid annular envelope, or more specifically, in respective lubrication housings which are themselves housed in the aforesaid annular envelope. The fourth bearing 42 is a ball bearing arranged radially facing the high pressure compressor 16, whereas the fifth bearing 44 is a roller bearing arranged axially between the high pressure 20 and low pressure 22 turbines.

As explained above, an aim of the invention is to enable an increase in the rate of dilution of the turbojet 10 without considerably increasing the radial and axial bulk of this turbojet.

To this end, it is desirable to increase the outer diameter of the inlet casing 12, while minimising the hub ratio of this inlet casing 12, that is to say the ratio between the diameter of the inner shell 12B and the diameter of the outer shell 12A, for example while maintaining the diameter of the inner shell 12B substantially unchanged.

As explained above, the increase in the outer diameter of the inlet casing 12 implies an increase in the axial and radial dimensions of the low pressure compressor 14, and consequently, an increase in the axial aerodynamic loads applied to the rotor 14A of the low pressure compressor 14, and thus to the low pressure shaft A2. Such an increase in the axial aerodynamic loads requires an increase in the dimensions of the first bearing supposed to take up these axial loads.

Yet, the minimisation of the hub ratio of the inlet casing, within which is housed the first bearing, does not enable such an increase in the dimensions of the first bearing.

In addition, the increase in the dimensions of the low pressure compressor 14 also implies an increase in the radial loads applied by the low pressure compressor to a front part of the low pressure shaft A2, situated facing the low pressure compressor.

FIG. 3 schematically illustrates an architecture of the turbojet 10 modified in accordance with the invention so as to resolve the technical problem described above.

In this turbojet 10 according to the invention, the low pressure shaft A2 is further supported by an additional bearing 50 borne by the intermediate casing 15 and arranged between the first bearing 30 and the second bearing 32.

This additional bearing 50 is a ball bearing, and thereby makes it possible to ensure the take up of the majority of the axial loads applied to the low pressure shaft A2, and in a secondary manner, the take up of radial loads applied to this low pressure shaft.

Due to the fact that this additional bearing 50 is arranged downstream of the first bearing 130, preferably radially facing the low pressure compressor, the volume available for this additional bearing 50 is greater than the volume available for the first bearing 130. The additional bearing 50 may thus be of dimensions greater than those of the first bearing of the known turbojet of FIG. 2, and thereby withstand the higher level of axial loads applied to the low pressure shaft A2 on account of the increase in the outer diameter of the inlet casing 12.

In addition, the axial loads being mainly taken up by the additional bearing 50, the first bearing 130 is, according to the invention, a roller bearing. Such a bearing, although being of moderate dimensions, enables an efficient take up of the radial loads at the level of the upstream end of the low pressure shaft A2.

Moreover, the radial loads in the front part of the low pressure shaft A2 are taken up more efficiently by the first bearing 130 and the additional bearing 50 than in the known turbojet of FIG. 2, due to the fact that the axial distance D1 between the first bearing 130 and the additional bearing 50 is reduced compared to the axial distance D0 between the first bearing 30 and the second bearing 32 of the turbojet of FIG. 2. The first bearing 130 and the additional bearing 50 thereby make it possible to withstand the increase in these radial loads induced by the increase in the dimensions of the low pressure compressor.

Given the presence of the additional bearing 50, the second bearing 32 is optionally shifted downstream with respect to its position in the known turbojet of FIG. 2. The second bearing 32 may thus be arranged radially facing the intermediate casing 15, or facing the junction between the low pressure compressor 14 and the intermediate casing 15 as shown very schematically in FIG. 3. In all cases, the invention makes it possible to avoid an increase in the axial distance D2 between the second bearing 32 and the third bearing 34, which would be detrimental to the correct operation of the turbojet. Indeed, an increase in this axial distance would have the effect of reducing the frequency of the first bending eigenmode of the low pressure shaft A2, at the risk that this frequency falls within the operating range of the turbojet, in which case the turbojet would no longer satisfy the requirements according to which the frequency of the first eigenmode must be greater than 120% of the frequency corresponding to the maximum speed provided for the low pressure shaft during normal operation (commonly designated "redline").

In the particular case illustrated here, in which the turbojet comprises an inter-shaft bearing such as the fifth bearing 44 described above, particular attention must be paid to the bending eigenmodes because the high pressure shaft is capable of exciting the low pressure shaft at certain rotation frequencies. The advantage procured by the invention is in this case all the more considerable.

It is to be noted that, in the preferred embodiment of the invention, the bearings described above are the only bearings of the turbojet ensuring the guiding and the centering of the high pressure and low pressure shafts.

What is claimed is:

1. A twin spool turbojet (10), including, from upstream to downstream, an inlet casing (12), a low pressure compressor (14), an intermediate casing (15), a high pressure spool, a low pressure turbine (22), and an exhaust casing (24),
wherein the low pressure compressor (14) comprises a low pressure compressor rotor (14A), and the low pressure turbine (22) comprises a low pressure turbine rotor (22A) connected to the low pressure compressor rotor by a low pressure shaft (A2),
wherein the inlet casing (12) and the low pressure compressor (14) define an air inlet channel of the turbojet, which divides downstream of the low pressure compressor (14) into a primary flow channel passing through the high pressure spool, and into a secondary flow channel (29) extending around the primary flow channel,
wherein the low pressure shaft (A2) is supported by:
a first bearing (130) borne by the inlet casing (12),
a second bearing (32) borne by the intermediate casing (15), and
a third bearing (34) borne by the exhaust casing (24),
wherein the low pressure shaft (A2) is further supported by an additional bearing (50) borne by the intermediate casing (15) and arranged between the first bearing (130) and the second bearing (32),
wherein the first bearing (130) is a roller bearing and the additional bearing (50) is a ball bearing, and
wherein the first bearing (130) is arranged radially facing an upstream end of the low pressure compressor (14).

2. The turbojet according to claim 1, wherein the first bearing (130) is arranged at the level of an upstream end of the low pressure shaft (A2).

3. The turbojet according to claim 1, wherein the second bearing (32) is a roller bearing.

4. The turbojet according to claim 1, wherein the second bearing (32) is arranged radially facing the intermediate casing (15).

5. The turbojet according to claim 1, wherein the third bearing (34) is a roller bearing.

6. The turbojet according to claim 1, wherein the additional bearing (50) is arranged radially facing the low pressure compressor (14).

7. The turbojet according to claim 1, wherein the high pressure spool comprises a high pressure compressor (16) and a high pressure turbine (20) arranged downstream of the high pressure compressor (16),
wherein the high pressure compressor (16) comprises a high pressure compressor rotor (16A), and the high pressure turbine (20) comprises a high pressure turbine rotor (20A) connected to the high pressure compressor rotor by a high pressure shaft (A1), and
wherein the high pressure shaft (A1) is supported by a fourth bearing (42) borne by the intermediate casing (15) and a fifth bearing (44) interposed between the high pressure shaft (A1) and the low pressure shaft (A2) and arranged downstream of the fourth bearing (42) and upstream of the third bearing (34).

8. The turbojet according to claim 7, wherein the fourth bearing (42) is a ball bearing.

9. The turbojet according to claim 7, wherein the fifth bearing (44) is a roller bearing.

10. A twin spool turbojet (10), including, from upstream to downstream, an inlet casing (12), a low pressure compressor (14), an intermediate casing (15), a high pressure spool, a low pressure turbine (22), and an exhaust casing (24),
wherein the low pressure compressor (14) comprises a low pressure compressor rotor (14A), and the low pressure turbine (22) comprises a low pressure turbine rotor (22A) connected to the low pressure compressor rotor by a low pressure shaft (A2),
wherein the inlet casing (12) and the low pressure compressor (14) define an air inlet channel of the turbojet, which divides downstream of the low pressure compressor (14) into a primary flow channel passing through the high pressure spool, and into a secondary flow channel (29) extending around the primary flow channel,
wherein the low pressure shaft (A2) is supported by:
a first bearing (130) borne by the inlet casing (12),
a second bearing (32) borne by the intermediate casing (15), and
a third bearing (34) borne by the exhaust casing (24),
wherein the low pressure shaft (A2) is further supported by an additional bearing (50) borne by the intermediate casing (15) and arranged between the first bearing (130) and the second bearing (32),
wherein the first bearing (130) is a roller bearing and the additional bearing (50) is a ball bearing, and
wherein the second bearing (32) is arranged radially facing a junction between the low pressure compressor (14) and the intermediate casing (15).

11. The turbojet according to claim 10, wherein the first bearing (130) is arranged radially facing the inlet casing (12).

12. The turbojet according to claim 10, wherein the first bearing (130) is arranged at an upstream end of the low pressure shaft (A2).

13. The turbojet according to claim 10, wherein the second bearing (32) is a roller bearing.

14. The turbojet according to claim 10, wherein the third bearing (34) is a roller bearing.

15. The turbojet according to claim 10, wherein the additional bearing (50) is arranged radially facing the low pressure compressor (14).

16. The turbojet according to claim 10, wherein the high pressure spool comprises a high pressure compressor (16) and a high pressure turbine (20) arranged downstream of the high pressure compressor (16),
wherein the high pressure compressor (16) comprises a high pressure compressor rotor (16A), and the high pressure turbine (20) comprises a high pressure turbine rotor (20A) connected to the high pressure compressor rotor by a high pressure shaft (A1), and
wherein the high pressure shaft (A1) is supported by a fourth bearing (42) borne by the intermediate casing (15) and a fifth bearing (44) interposed between the high pressure shaft (A1) and the low pressure shaft (A2) and arranged downstream of the fourth bearing (42) and upstream of the third bearing (34).

17. The turbojet according to claim 16, wherein the fourth bearing (42) is a ball bearing.

18. The turbojet according to claim 16, wherein the fifth bearing (44) is a roller bearing.

* * * * *